United States Patent [19]

Liu

[11] Patent Number: 5,162,412
[45] Date of Patent: Nov. 10, 1992

[54] POLYESTER COMPOSITIONS HAVING IMPROVED WEAR CHARACTERISTICS

[75] Inventor: Ping Y. Liu, Naperville, Ill.

[73] Assignee: General Electric Company, Pittsfield, Mass.

[21] Appl. No.: 736,730

[22] Filed: Jul. 26, 1991

[51] Int. Cl.$^5$ .......................... C08K 5/13; C08K 5/15; C08K 5/52

[52] U.S. Cl. ................................. 524/291; 524/114; 524/143; 524/296; 524/318; 524/545; 525/199

[58] Field of Search ............... 524/318, 322, 291, 545, 524/546, 296, 114, 127, 143; 525/199

[56] References Cited

U.S. PATENT DOCUMENTS

| | | | |
|---|---|---|---|
| 3,595,936 | 7/1971 | Birenzvige et al. | 524/291 |
| 4,530,953 | 7/1985 | Yoshida | 524/318 |
| 4,972,015 | 11/1990 | Carico et al. | 524/291 |

FOREIGN PATENT DOCUMENTS

| | | |
|---|---|---|
| 2452329 | 5/1976 | Fed. Rep. of Germany . |
| 69956 | 6/1977 | Japan . |
| 2179557 | 8/1987 | Japan . |
| 2297349 | 12/1987 | Japan . |
| 2075032 | 11/1981 | United Kingdom . |

*Primary Examiner*—Paul R. Michl
*Assistant Examiner*—Tae H. Yoon
*Attorney, Agent, or Firm*—Mary Montebello

[57] ABSTRACT

This invention relates to thermoplastic molding compositions, particularly thermoplastic polyesters, having incorporated therein a fluorinated polyolefin to improve wear resistance. More particularly, disclosed are polyester compositions having improved wear resistant good properties comprising a polyester resin, most preferably a poly(butylene terephalate) resin; a fluorinated polyolefin compound and a hindered phenolic compound and an ester compound, the last two components serving as a migrator package that serves to push a disproportionate amount of the fluorinated polyolefin within the subsurface of the resulting composition to thereby augment the wear resistant effect of the fluorinated polyolefin.

16 Claims, No Drawings

POLYESTER COMPOSITIONS HAVING IMPROVED WEAR CHARACTERISTICS

This invention relates to thermoplastic molding compositions, particularly thermoplastic polyesters, having incorporated therein a fluorinated polyolefin to improve wear resistance. More particularly, disclosed are polyester compositions having improved wear resistant properties comprising a polyester resin, most preferably a poly(butylene terephalate) resin; a fluorinated polyolefin compound, a hindered phenolic compound and a specified ester compound, the last two components serving as a migrator package that serves to locate a disproportionate amount of the fluorinated polyolefin within the subsurface of the resulting polyester composition to thereby augment the wear resistant effect of the fluorinated polyolefin.

BACKGROUND OF THE INVENTION

High molecular weight polyesters and particularly polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539. These patents disclose that the polyesters are particularly advantageous as film and fiber-formers.

With the development of molecular weight control, the use of nucleating agents and two-step molding cycles, poly(ethylene terephthalate) has become an important constituent of injection moldable compositions. Further, poly(1,4-butylene terephthalate), because of its very rapid crystallization from the melt, is uniquely useful as a component in such compositions. Work pieces molded from such polyester resins, in comparison with other thermoplastics, offer a high degree of surface hardness and abrasion resistance, high gloss, and lower surface friction.

Furthermore, in particular, poly(1,4-butylene terephthalate) is much simpler to use in injection molding techniques than poly(ethylene terephthalate). For example, it is possible to injection mold poly (1,4-butylene terephthalate) at lower mold temperatures of from about 230° C. to 260° C. to produce highly crystalline, dimensionally stable moldings in short cycle times. On account of the high rate of crystallization, even at low mold temperatures, no difficulty is encountered in removing the moldings from the molds.

It is also known to add certain additives to thermoplastic polyesters to enhance or provide certain properties. For example, Rein et al, U.S. Pat. No. 3,405,198, discloses the use of polyethylene in poly(ethylene terephthalate) as an impact modifier. Holub et al, U.S. Pat No. 4,122,061, discloses polyester compositions which comprise a poly(1,4-butylene terephthalate) resin, a poly(ethylene terephthalate) resin, a fibrous glass reinforcement, alone or in combination with a mineral filler and, as an impact modifier therefor, a polyolefin or olefin based copolymer resin including polyethylene and propyleneethylene copolymer. Cohen et al, U.S. Pat. No. 4,185,047, disclose the use of high pressure low density polyethylene in thermoplastic polyester compositions, particularly poly(ethylene terephthalate) and poly (1,4-butylene terephthalate) for improved mold releasability. Kohler, et al, U.S. Pat. No. 4,666,972, teaches a thermoplastic molding composition comprising a polyalkylene terephthalate, a graft polymer and a fluorinated polyolefin. This reference indicates that molding compositions are considerably tougher, and have much higher moduli of elasticity than molding compositions which are free from fluorinated polyolefins.

It is further known that dispersing poly(tetrafluoroethylene) in poly(butylene terephthalate) produces a molded compound with increased resistance to wear. For example Hilt, et al, German Offen. 2,452,329, teaches a composition containing 75–99 parts PBT and 1–25 parts poly(tetrafluoroethylene), which is dispersed in the polyester in the form of the discreet particles of average size 0.15–0.80 microns.

It has been discovered that the wear resistance properties of polyesters that are compounded with fluorinated polyolefins are improved if there is not a homogeneous dispersion of fluorinated polyolefin throughout the composition but rather if there is a disproportionate concentration of such polyolefins located within the subsurface of the polyester/polyolefin composition. Normally, the fluorinated polyolefin will be homogeneously dispersed throughout the blended composition. In this regard, it has been further discovered that a combination of a hindered phenolic compound and a specified ester compound, when used in conjunction with a polyester and fluorinated polyolefin, functions as a migrator in the blended composition to thereby facilitate the location of a disproportionate amount of fluorinated polyolefin within the subsurface of the blended compound. This tends to augment the wear resistance properties of the fluorinated polyolefin so that less of this compound is needed in order to achieve the desired wear resistance properties of the resulting polyolefin composition. The term "migrator" or "migrator package" is used herein to indicate a component package that, when utilized in conjunction with a polyester and fluorinated polyolefin blend, produces a resulting composition that has a greater concentration of fluorinated polyolefin component located within the subsurface (that is, defined herein as being within about three microns, and preferably within one micron of the surface) of the composition then similar compositions compounded without the migrator package materials. It should be noted that the exact mechanism whereby the fluorinated polyolefin material tends to be located within the subsurface of the composition in a higher concentration than would be expected is not considered to be part of the present invention and no claim is made as to any particular theory of exactly how this may be accomplished on a molecular level, other then that the location of the fluorinated polyofefin is clearly causally related to the presence of the migrator package in the blend.

DESCRIPTION OF THE INVENTION

The first component of the composition of the present invention is a polyester compound.

The preferred polyesters utilized in the present invention are higher molecular weight polyesters, most preferably linear polymeric glycol esters of terephthalic acid and isophthalic acids. They can be prepared by known techniques such as by the alcoholysis of esters of the phthalic acid with a glycol and subsequent polymerization, by heating glycols with the free acids or with halide derivatives thereof, or by similar processes. These are described in U.S. Pat. Nos. 2,465,319 and 3,047,539, and elsewhere. In addition to the phthalate, amounts, e.g., from about 0.5 to 15% by weight, of other aromatic dicarboxylic acids, such as naphthalene dicarboxylic acid, can be present in the polyester component. Although the term "linear" is used, the reactants can also include amounts of tri- or polyfunctional branching agents, such as trimethylolpropane, pentaerythritol, and trimethyl trimesate.

Preferred polyesters will be of the family consisting of high molecular weight, polymeric glycol terephthalates or isophthalates having repeating units of the general formula:

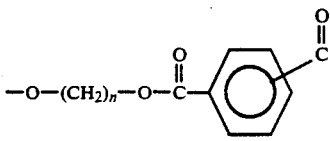

wherein n is an integer of from 2 to 10, preferably from 2 to 4, and mixtures of such esters, including copolyesters of terephthalic and isophthalic acids of up to about 30 mole % isophthalic units.

Especially preferred polyesters are poly(ethylene terephthalate) and a poly(butylene terephthalate), mixtures thereof, and the most preferred polyester is poly(1,4-butylene terephthalate).

The second component in the composition is a fluorinated polyolefin.

The fluorinated polyolefins are of high molecular weight and possess glass transition temperatures above −30° C., generally above 100° C., fluorine contents of from 59% to 76%, preferably from 65% to 76%, by weight and average particle diameters d<50 microns preferably of from about 1 to about 20 microns, more preferably from about 2 to about 18 microns, and most preferably from about 2.5 to about 8 microns. Preferred fluorinated polyolefins include polytetrafluoroethylene, polyvinylidenefluoride, tetrafluor- ethylene/- hexafluoropropylene and- ethylene/tetrafluor- ethylene copolymers. The fluorinated polyolefins are known: U.S. Pat. Nos. 3,671,487; 3,723,373 and 3,838,092.

The fluorinated polyolefins are preferably used in unsintered form.

One suitable fluorinated polyolefin for use in the present invention is Whitcon TL 368, a polytetrafluoroethylene lubricant powder, a product of ICI Americas, Inc. This compound has the following typical properties:

| | |
|---|---|
| Particle size, image analyzer | 9 microns |
| Particle size, Fisher sub sieve sizer | 2-3 microns |
| Surface area, nitrogen adsorption | 2.4 m²/g |
| Oil absorption | 40.7 lb oil/100 lbTL |
| Bulk density | 375-450 g/l |
| Specific gravity | 2.2 |

Another commercially available fluorinated polyolefin for use in the present invention is Teflon MP 1,400, a product available from the Dupont Company, which has the following typical properties:

| | |
|---|---|
| Average Bulk Density | 450 g/L |
| Melting Peak Temperature | 325 ± 10 ° C. |
| Particle Size Distribution | 10% < 7 |
| | Avg. 12 |
| | 90% <20 |

The first component in the migrator package is a hindered phenolic compound. The hindered phenolic compounds suitable for use herein are hindered phenols which include phenols of the formula:

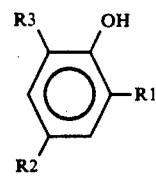

wherein R1 and R3 are hydrocarbon groups having from one to about 20 carbon atoms, and R2 is a hydrogen atom or a hydrocarbon group having from one to about 20 carbon atoms, or a bisphenol of the formula

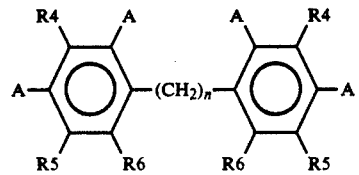

wherein R4, R5 and R6 are each a hydrogen atom or a hydrocarbon group having from one to about 20 carbon atoms, one of the two A's on each ring is a hydroxyl group and the other A on each ring is a hydrogen atom or a hydrocarbon group having from one to about 20 carbon atoms; and n is an integer of from 0 to about 20.

Preferred hindered phenols useful in this invention include 2,6-di-tert-butyl-4-methyl-phenol, commonly known as BHT (sold under the tradename Ionol by Shell Chemical Co.); 4,4-methylene bis(2,6-di-tert--butylphenol) and 2,6-di-tert-butyl-4-n-butylphenol (sold under the tradename Ethyl 702 and Ethyl 744, respectively, by Ethyl Corp.); and tetrakis[methylene 3-(3′,5′-di-tert-butyl-4′-hydroxyphenyl) propionate]methane and stearyl-3-(3′,5′-di-tert-tert-butyl-4′-hydroxy-phenyl) propionate (sold under the tradenames Irganox 1010 and Irganox 1076, respectively, by Ciba-Geigy). The most preferred hindered phenols for use in the migrator package of the present invention are Irganox 1010 and Irganox 1076.

The second component in the migrator package is a ester compound selected from the diesters of dicarboxylic acids and saturated monohydric alcohols, pentaerythritol fatty acid esters, abietic acid esters, epoxidized fatty acid esters and phosphoric acid esters. Especially preferred of the above include the dialkyl-, or alkyl aryl-esters of aromatic or saturated or unsaturated aliphatic dicarboxylic acids, the tetraacyl esters of pentaerythritol, the alkyl abietates, the alkyl epoxy fatty acid esters and the alkyl-, aryl-, aralkyl-, alkaryl- or alkylaryl- phosphates. Typical ester compounds include dibutylphthalate, diisooctylphthalate, dioctylphthalate, butyloctylphthalate, n-octyl-n-decylphthalate, dicyclohexylphthalate, diphenylphthalate, butylbenzylphthalate, dibutyl adipate, diisooctyl adipate, benzyloctyl adipate, di-2-ethylbutyl azelate, di-n-hexyl azelate, dibutyl fumarate, dicyclohexyl maleate, dibutyl maleate, dioctyl maleate, dibutyl itaconate, dioctyl sebacate, the pentaerythritol tetraester of mixed C4 to C9 acids, pentaerythritol tetrastearate, methyl abietate, hydrogenated methyl abietate, epoxidized octyl tallate, triphenyl phosphate, cresyl diphenyl phosphate, tricresyl phosphate, tridimethylphenyl phosphate, 2-ethylhexyl diphenyl phosphate, and trixenyl phosphate. The most preferred ester compound for use in the present invention is pentaerythritol tetrastearate.

A suitable commercially available ester compound for use in the present invention is Hercules Company's PE Tetrastearate synthetic wax, which typically has a setting point in the range of 54°–65° C., and a softening point in the range of 61°–72° C.

The preferred amount of the components in the migratory package utilized in the present invention will depend, to a certain extent on the amount of fluorinated polyolefin present in the composition of the present inventions. Typically, the amount of the fluorinated polyolefin will range from about 0.1 to about 10.00 weight percent based on the total weight of the composition, and preferably from about 0.3 to about 3 % by weight of the composition, and most preferably from about 0.5 to about 2% by weight of the composition. The amount of phenolic compound utilized in the present invention will typically range from about 0.05 to about 0.50 percent by weight, and preferably from about 0.08 to about 0.45 percent by weight of the total composition. Finally, the amount of the ester compound utilized in the present invention will typically range from about 0.05 to about 0.50 percent by weight, and preferably from about 0.08 to about 0.45 percent by weight of the total composition.

A significant advantage to the present invention is that less fluorinated polyolefin compound is required to impart wear resistance to the polyester compositions when modified with the migratory package then is needed in unmodified polyester/fluorinated polyolefin compositions. It would therefor follow that more polyester can be utilized in the blend so that the basic advantageous properties of the polyester will not be greatly altered, as would be the case if a greater amount of the fluorinated polyolefin had to be used in the blend.

It should be understood that the composition obtained according to this invention may contain one or more conventional additives such as, for example, antioxidants, carbon black, reinforcing agents, plasticizers, lubricity promoters, color stabilizers, ultraviolet absorbers, X-ray opacifiers, dyes, pigments, fillers, and the like, as long as such additives do not interfere with the unique migratory effect of the hindered phenol/polymer package which is blended with the polyester and fluorinated polyester compounds of the presented invention.

EXAMPLES

The following examples are presented to more fully and clearly illustrate the present invention. They are presented as illustrative of the invention and are not be construed as limiting the invention thereto. In the examples all parts and percentages are on weight basis unless otherwise specified.

In all the examples, the compositions were prepared by melt blending the polyester and the indicated additional components using a Prodex single screw extruder at approximately 243° C. Test specimens were prepared by injection molding in accordance with proper specifications for ASTM and UL determinations.

In the following examples, Examples 1, 3 and 5 illustrates the prior art composition that does not utilize the migratory package of the present invention are, accordingly, outside the scope thereof.

TABLE I

| COMPONENT | EXAMPLE NO. | | | | | |
|---|---|---|---|---|---|---|
| | 1 | 2 | 3 | 4 | 5 | 6 |
| PBT | 99 | 98.65 | 98 | 97.65 | 97 | 96.65 |
| PTFE | 1 | 1 | 2 | 2 | 3 | 3 |
| HP | — | 0.15 | — | 0.15 | — | 0.15 |
| PETS | — | 0.2 | — | 0.2 | — | 0.2 |

PBT is poly(1,4 butylene terephalate)
PTFE is polytetrafluoroethylene (particle size average 6 micron, ranging between 1 and 17 micron).
HP is a hindered phenol (Irganox 1076).
PETS is pentaerythritol tetrastearate.

The compositions formulated according to Examples 1–6 were tested by x-ray frequency to determine the weight percent of PTFE within the subsurface (up to and including 3 microns deep). The results of the test are set forth in TABLE II:

TABLE II

| EXAMPLE NO. | PTFE | PTFE in Subsurface |
|---|---|---|
| 1 | 1 | 1.40 |
| 2 | 1 | 2.06 |
| 3 | 2 | 2.12 |
| 4 | 2 | 3.08 |
| 5 | 3 | 2.90 |
| 6 | 3 | 4.76 |

The results of the tests indicate that those compositions additionally formulated with the miqrator package all exhibit an increase in the amount of PTFE within the subsurface of the composition, with said increase ranging from appx. 45% to appx. 64% by weight.

Subsequent tests on the compositions of the examples indicated that the compositions of examples 2, 4 and 6 illustrated improved wear resistance over the corresponding compositions of, respectively, examples 1, 3 and 5 which were not formulated with the migratory package of the present invention. For example, the K factor (measured by ASTM D-3702 procedure) for Example 3 showed a result of $785 \times 10^{-10}$ (in. hour/psi$\times$fpm) while the K factor for Example 4 showed a significant decrease to $520 \times 10^{-10}$.

Obviously, other modifications and variations of the present invention are possible in light of the above teachings. It is therefore to be understood that changes may be made in the particular embodiments of the invention described which are within the full intended scope of the invention as defined by the appended claims.

What is claimed is:

1. A polyester composition having improved wear characteristics comprising
   (a) at least one polyester resin;
   (b) a fluorinated polyolefin;
   (c) a hindered phenolic compound and
   (d) an ester compound selected from the diesters of dicarboxylic acids and saturated monohydric alcohols, pentaerythritol fatty acid esters, abietic acid esters, epoxidized fatty acid esters and phosphoric acid esters; wherein the fluorinated polyofefin compound is present in the amount of from about 0.1 parts to about 10 parts by weight per one hundred parts by weight of the total component; the hindered phenolic compound is present in the amount of from about 0.05 to about 0.5 parts by weight per one hundred parts by weight of the total composition and the pentaerythritol fatty acid ester is present in the amount of from about 0.05 parts to about 0.5 parts by weight per one hundred ports by weight of the total composition.

2. The composition of claim 1 wherein component (b) is present in the amount of from about 0.3 parts to about 3.0 parts by weight per one hundred parts by weight of the total component.

3. The composition of claim 1 wherein component (c) is present in the amount of from about 0 08 to about 0.45 parts by weight per one hundred parts by weight of the total composition.

4. The composition of claim 1 wherein component (d) is present in the amount of from about 0.08 parts to about 0.45 parts by weight per one hundred parts by weight of the total composition.

5. The composition of claim 1 wherein the at least one polyester resin is a high molecular weight linear thermoplastic polyester resin selected from the group consisting of polymeric glycol terephthalate and isophthalate esters having repeating units of the general formula:

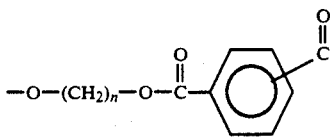

wherein n is an integer of from 2 to 10, or a mixture of such esters.

6. The composition of claim 5 wherein the at least one polyester resin is at least one of poly(1,4-butylene terephthalate) and poly(ethylene terephthalate) ester resins.

7. The composition of claim 1 wherein compound (c) is selected from (i) tetrakis[methylene 3-(3',5'-di-tert-butyl-4'-hydroxyphenyl) propionate]- methane and (ii) stearyl-3-(3',5'-di-tert-tert-butyl-4'-hydroxy-phenyl) propionate.

8. The composition of claim 1 wherein compound (d) is a pentaerythritol fatty acid ester.

9. The composition of claim 8 wherein the pentaerythritol fatty acid ester is pentaerythritol tetrastearate.

10. The composition of claim 8 wherein compound (b) is comprised of particles having an average diameter of from about 1 to about 20 microns.

11. The composition of claim 10 wherein compound (b) is comprised of particles having an average diameter of from about 2 to about 18 microns.

12. The composition of claim 11 wherein compound (b) is comprised of particles having an average diameter of from about 2.5 to about 8 microns.

13. A polyester composition having improved wear characteristics comprising:
(a) a poly (butylene terephthalate) resin;
(b) a fluorinated polyolefin compound; and (c) a migrator package comprised of (i) a hindered phenolic compound; and (ii) a pentaerythritol fatty acid ester, wherein the fluorinated polyolefin is comprised of particles having an average diameter of from about 1 to about 20 microns, wherein component (a) is present in an amount ranging from about 89 to about 99.8 percent by weight of the total composition.

14. A method for increasing the amount of a fluorinated polyolefin compound that is located within the subsurface of a polyester resin composition containing a poly (butylene terephthalate) resin composition and a fluorinated polyolefin compound, comprising mixing at the same time as the resin and the fluorinated polyolefin compound a migrator package comprised of (i) a hindered phenolic compound; and (ii) a pentaerythritol fatty acid ester.

15. The method of claim 14 wherein the fluorinated polyolefin compound is present in the amount of from about 0.1 parts to about 10 parts by weight per one hundred parts by weight of the total composition; the hindered phenolic compound is present in the amount of from about 0.05 to about 0.5 parts by weight per one hundred parts by weight of the total composition; the pentaerythritol fatty acid ester is present in the amount of from about 0.05 parts to about 0.5 parts by weight per one hundred parts by weight of the total composition, and the poly (butylene terephthalate) resin is present in an amount ranging from about 89 to about 99.8 percent by weight of the total composition.

16. The method of claim 15 wherein the fluorinated polyolefin compound is comprised of particles having an average diameter of from about 1 to about 20 microns.

* * * * *